US012563321B2

(12) United States Patent
Thorne et al.

(10) Patent No.: US 12,563,321 B2
(45) Date of Patent: Feb. 24, 2026

(54) IMAGE SENSING DEVICE

(71) Applicant: Leonardo UK Ltd, London (GB)

(72) Inventors: Peter Thorne, London (GB); Martin Herbert, London (GB)

(73) Assignee: LEONARDO UK LTD, London (GB)

( * ) Notice: Subject to any disclaimer, the term of this patent is extended or adjusted under 35 U.S.C. 154(b) by 85 days.

(21) Appl. No.: 18/546,301

(22) PCT Filed: Feb. 15, 2022

(86) PCT No.: PCT/EP2022/053713
§ 371 (c)(1),
(2) Date: Aug. 14, 2023

(87) PCT Pub. No.: WO2022/171903
PCT Pub. Date: Aug. 18, 2022

(65) Prior Publication Data
US 2024/0121535 A1 Apr. 11, 2024

(30) Foreign Application Priority Data

Feb. 15, 2021 (GB) ...................................... 2102096

(51) Int. Cl.
*H04N 25/76* (2023.01)
*G01S 17/894* (2020.01)
(Continued)

(52) U.S. Cl.
CPC ......... *H04N 25/7795* (2023.01); *H04N 25/77* (2023.01)

(58) Field of Classification Search
CPC .... H04N 25/77; H04N 25/795; H04N 25/771; H04N 25/772; H04N 25/705; H04N 25/7795; G01S 17/894; G01T 3/005
See application file for complete search history.

(56) References Cited

U.S. PATENT DOCUMENTS

| | | | |
|---|---|---|---|
| 10,422,890 B2 | 9/2019 | Sato | |
| 2006/0158542 A1 | 7/2006 | Mizuno et al. | |

(Continued)

FOREIGN PATENT DOCUMENTS

| | | |
|---|---|---|
| JP | 2008042826 A | 2/2008 |
| JP | 2017130891 A | 7/2017 |

OTHER PUBLICATIONS

International Search Report (PCT/ISA/210) and Written Opinion (PCT/ISA/237) mailed on Jun. 29, 2022 by the European Patent Office as the International Searching Authority for International Application No. PCT/EP2022/053713. (13 pages).

(Continued)

*Primary Examiner* — Marly S Camargo
(74) *Attorney, Agent, or Firm* — Buchanan Ingersoll & Rooney PC

(57) ABSTRACT

An active imaging system including a laser to illuminate a scene and an imaging device to receive returns reflected from the scene. The imaging device including an array of pixel circuits, each pixel circuit including a photodiode connected to multiple track and hold circuits and a timing circuit configured to operate the track and hold circuits in quick succession such that each track and hold circuit captures an information signal indicative of returns arriving during different successive time periods during a gate period and thus provides 3D image data based on the arrival times of returns from the scene during the gate period.

11 Claims, 5 Drawing Sheets

(51) Int. Cl.

| | |
|---|---|
| *H04N 25/705* | (2023.01) |
| *H04N 25/77* | (2023.01) |
| *H04N 25/771* | (2023.01) |
| *H04N 25/772* | (2023.01) |

(56) References Cited

U.S. PATENT DOCUMENTS

| | | | |
|---|---|---|---|
| 2008/0049128 A1 | 2/2008 | Murata et al. | |
| 2011/0304758 A1 | 12/2011 | Eldesouki et al. | |
| 2015/0163436 A1* | 6/2015 | Hijikata | H04N 25/76 |
| | | | 250/208.1 |
| 2017/0163922 A1* | 6/2017 | Hagihara | H10F 39/18 |
| 2017/0212252 A1 | 7/2017 | Sato | |
| 2021/0243350 A1* | 8/2021 | Johnson | H10F 39/18 |
| 2024/0103176 A1* | 3/2024 | Barr | G01S 17/894 |

OTHER PUBLICATIONS

Patents Act 1977: Combined Search and Examination Report under Sections 17 and 18(3) 2 dated Nov. 11, 2021 issued by the Intellectual Property Office in corresponding Great Britain Application No. GB2102096.1. (10 pages).

First Office Action issued on Oct. 29, 2024, by the Japanese Patent Office in corresponding Japanese Patent Application No. 2023-549083, and an English Translation of the Office Action. (6 pages).

https://www.analog.com/media/en/training-seminars/design-handbooks/high-speed-design-seminar/Section3.pdf. (30 pages).

https://electronics.stackexchange.com/questions/312463/track-vs-sample-and-hold. (3 pages).

Office Action issued on Aug. 28, 2024, by the Great Britain Patent Office in corresponding Great Britain Patent Application No. GB2102096.1. (2 pages).

* cited by examiner

Photo Detector Circuit                Track and Hold Circuits  9

Pixel Circuit  7

IMAGE SENSING DEVICE

FIELD

The present invention relates to an image sensing device for use in an active imaging system.

BACKGROUND

A number of different technologies and approaches to sense or sample reflected laser light are currently used in active imaging systems. Four example technologies are detailed below.

i) A 2D burst Illumination (BIL) detector uses a single gate period to acquire a snapshot of typically 10 ns-100 ns gate time duration or the laser light pulse, or a proportion of it reflected from the scene of interest. The image is planar and contains little or no 3D context information. Narrower gate times can be selected to improve depth perception. The gate time can be delayed until after the arrival of reflected light from the object of interest, imaging the background and revealing a silhouette of the object. Additional images can be acquired bracketing the target range to provide context for the scene of interest. Multiple frames can be acquired to improve the image quality. The duration of the gate influences and ultimately limits the range depth resolution and accuracy that can be achieved. Generating shorter gate times has technical challenges and is ultimately limited by the effects of jitter which limits the achievable range depth accuracy. Early devices had limited sensitivity due to avalanche photodiode (APD) gain limitation.

ii) A swept 2D detector is similar to (i) but varies the phase of the acquisition to take a number of snapshots that 'sweep through' the target's depth to build up a 3D model of the target. Again, similar limitations on gate timing and APD gain prevail.

iii) A 3D (BIL) detector operates similarly to 2D BIL detector but each acquired frame may be further processed on chip by using a timer circuit in each pixel to determine the signal depth (nearer and further signals produce different signal levels within the gate period), but the processing is sensitive to variation in intensity, which can distort the 3D image although post processing corrections can be applied. Again similar limitations on gate timing and APD gain prevail.

iv) A Geiger mode detector measures the arrival time of the first detected photon, and is not sensitive to the arrival of all other subsequent photons until the detector array is reset. A Geiger mode detection event creates an avalanche effect that requires the detector to be reset or quenched to restore it to its detection threshold before it can sense again. In a photon starved regime, and due to Poisson statistics, sometimes the arrival of the first or even the second photon is not detected, allowing the arrival of subsequent photons from more distant surfaces to be detected occasionally.

Multiple frames can be acquired to derive information in the form of a point cloud data cube that reveals characteristics of the target's 3D profile. The pixel pitch of the Geiger mode detector array is limited to relatively large sizes of 25 um-100 um. Array sizes to-date are relatively small: 32×32 and 128×32, limited mainly by the silicon process node which sets the track density, and the required ROIC pixel array tracking to connect the pixels to the timing circuits that are generally located externally to the pixel array due to their size.

Multiple acquisition cycles are needed to acquire further range depth information and to improve accuracy. The increased imaging time can influence or limit how the image is acquired and its quality, taking account of any relevant motion between the imager and the target.

A further example of the prior art is US2006158542 which examples an image sensing device capable of capturing samples of a photo signal at different times during a shutter period.

U.S. Pat. No. 10,422,890B2 describes an image device for radiation sensing comprising three sample and holds circuits operated in sequence. Two of the sample and hold circuits provide different sensitivities to the photo signal, the third provides a pixel offset. This arrangement relies on the signal not changing appreciably during the sequence time that the three circuits are operated, and arguable also over the whole scan. The use of sample and hold circuits are needed to provide the pixel offset.

US2008/0049128 describes an imaging device that uses multiple sample and hold circuits to capture successive images. Neither U.S. Pat. No. 10,422,890B2 or US2008/0049128 are adapted to take successive images at rates suitable for use in an active imaging system that can provide 3D image data based on arrival time of photons from a scene.

SUMMARY

According to a first aspect of the invention there is provided an image sensing device for use in an active imaging system, the image sensing device comprising pixel circuits;

each pixel circuit comprising:
    a) a photo detector circuit comprising a photo detector element arranged to output a time varying photo signal during a gate period;
    b) multiple storage circuits each arranged to receive and store the photo signal from the photo detector circuit; and
    c) a separate switch associated with each storage circuit through which the respective storage circuit is connectable to the photo detector circuit;
  the image sensing device comprising a timing controller circuitry to operate the switches in sequence to capture samples of the time varying photo signal at different times over the gate period;
  characterised in that each pixel circuit comprises a buffer amplifier connected between the photo detector circuit and the storage circuits to substantially isolate the photo detector circuit from changes in the capacitive load of the multiple storage circuits.

In the application of an active imaging system, targets in a scene lying at different distances from the device will cause returns at different times during the gate period.

This also applies to different surfaces of the same target lying at different distances from the device. The different signals held on each storage circuit thereby provide 3D image information of the targets and/or the target. In other words the image sensing device is able to provide 3D image data based on the arrival times of returns from the scene during the gate period.

For each storage circuit to capture image information of a target(s) at different distances from the sensing device, i.e. discriminate between photos arriving a different times during the gate period, the timing controller circuitry and pixel circuitry need to be capable of operating the switches in very fast succession. For the distances anticipated in terrestrial active image sensing applications, a time interval between operating two consecutive switches equal or below 30 ns is typically required and <200 ps where different surfaces of a target are to be distinguished.

Connecting the photodetector directly to the storage circuits exposes the photodetector to changes in the capacitive load of the multiple storage circuits reducing the size of the time varying photo signal and thus reducing photosensitivity meaning that it may not be possible to resolve small signals of potential importance. Isolating the photo detector circuit from the capacitive load of the storage circuits using the buffer amplifier allows the photosensitivity of the photo detector circuit to be maintained.

In a preferred implementation the buffer amplifier comprises a source follower transistor and a current source load. This implementation provides a simple low component solution. Additionally or alternatively the buffer amplifier may include an operational amplifier through this is less preferred because it requires significantly more transistors and has less favourable characteristics with regard to signal dynamics, slew rate, noise, and power usage.

The source follower transistor may be a MOSFET though any dielectrically isolated transistor may inherently provides the capacitive load isolation function.

Favourably each storage circuit comprises a track and hold circuit. It is possible to use sample and hold circuits instead though this is less preferred because to achieve signal settling in shorter gate times a proportionally higher current is needed to charge the storage capacitor, increasing power dissipation, and nullifying the speed and power advantages gained by the invention.

In a preferred arrangement, the timing controller circuitry is configured to operate the switches so that all of the storage circuits simultaneously capture the time varying signal and are then disconnected from the photo detector circuit one by one at different times during the gate period.

To resolve small photo signal voltages within the gate period, the source follower transistor gain must be set sufficiently high by operating with a high transistor drain current. If the gain is insufficient, the transistor output settling time will exceed shorter gate periods, or for smaller voltages will fail to resolve to the correct value.

A higher transistor drain current corresponds to higher power dissipation per pixel. This provides a constraint on the practical size of array that can be operated.

A solution is to include a bias controller configured to switch the bias condition of the source follower transistor current such that it is operable in a quiescent (low current) condition outside of the gate period and in a high bias condition during the gate period. As the gate period is usually a relatively small portion of the total period for taking a frame, this solution allows the desired source follower transistor current, speed and settling performance of the transistor to be achieved with only a small increase in root mean square (rms) power dissipation and, as a result, without significant perturbation in the operating temperature of the sensing device.

The timing controller circuitry and the multiple storage circuits may be carried on a single integrated semiconductor die. This arrangement reduces jitter in the switching times of the switches of the storage circuits. The bias controller may also be carried on the same single integrated semiconductor die as the timing controller circuitry and/or the multiple storage circuits The timing circuitry may comprise a chain of delay stages implemented using inverters. Each delay stage may comprise at least two inverters. This arrangement is able to provide very short delays, e.g. <200 ps, thereby allowing for very short intervals between operating the switches of the different storage, e.g. track and hold, circuits of the pixel circuit. Equally, this arrangement also allows for longer interval lengths, e.g. up to 30 ns, providing significant flexibility in the interval times that can be chosen.

The timing circuitry may comprise means to control the operational timing of the switches of the storage circuits within a pixel circuit. In this way the timings can be selected to suit the relative distances of different objects of interest from the device and thus avoids looking for returns at distances where there are no expected objects of interest.

For example, the timing circuit may be used to:

select the length of delay before the first track and hold circuit is operated after the gate is opened; and/or allow for independent control of the timing of each switch of each track of hold circuit.

Where there is a large separation distance between two objects of interest in the scene such that a first object of interest it relatively close to the image sensing device and second object of interest is relatively far from the image sensing device, the timing circuitry may be configured to operate one or more of the track and hold circuits during times when returns from the first object are expected in order to provide information (e.g. 3D information) about the first object with the remaining track and hold circuit(s) being configured to operate when returns from the second object are expected to provide information (e.g. 3D information) about the second object.

The photo detector may comprise an avalanche photo detector. Avalanche photo detectors are advantageous as they output a signal photo current that is larger than the detected photo current.

To provide the desired performance for many applications, the circuit is favourably implemented on a fast mixed signal silicon process providing low parasitic circuit elements and supporting signal slew rates in the order of volts per nano second (V/ns). The slew rate is compatible with small photo signal voltages in the range of gate times of interest. This may be achieved by fabricating the pixel circuit on a compatible silicon process. Typical processes include 0.18 um, in other words where transistors have a gate length of 0.18 um.

The image sensing device may be part of an active imaging system that also comprises a laser for illuminating a scene with a light pulse, the image sensing device being adapted to image light from the laser that has been reflected from the scene.

The invention will now be described by way of example with reference to the following figures in which:

DETAILED DESCRIPTION

Figure 1:
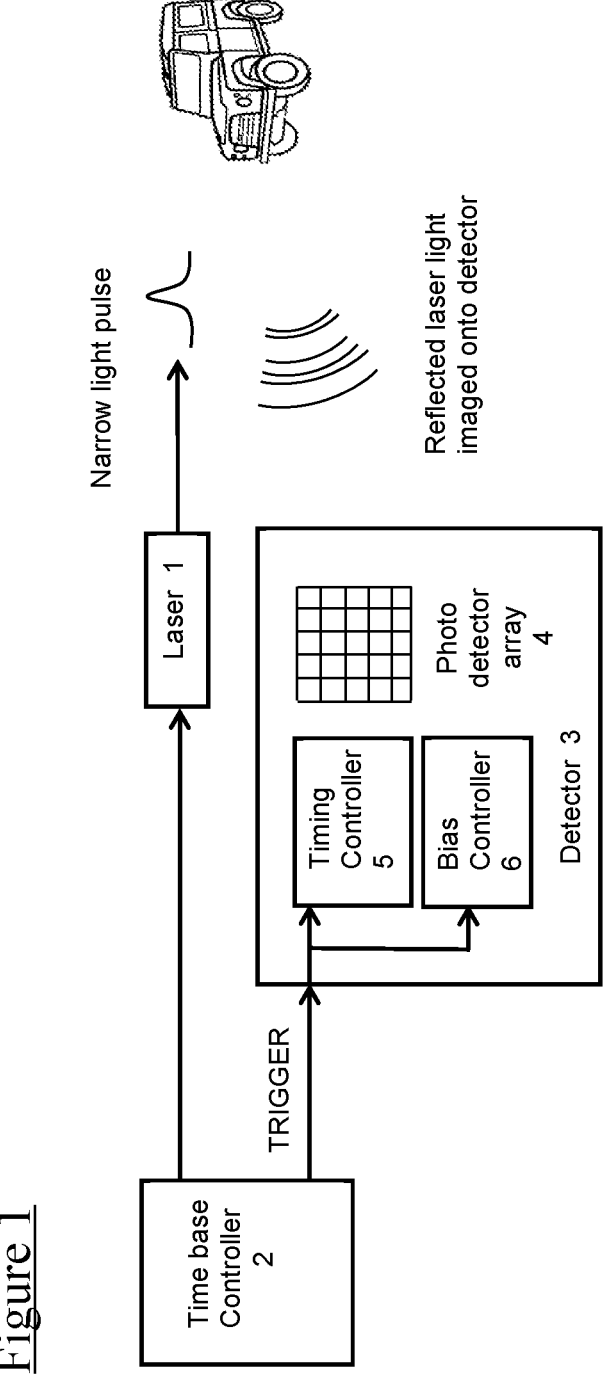
FIG. 1 is a schematic of an active imaging system.

FIG. 1 is a schematic of an active imaging system. The active imaging system comprises a laser 1 for illuminating a scene with a narrow light pulse, e.g. short wave infrared; a time base controller 2, and a detector 3 comprising: a photo detector array 4, a timing controller 5 and a bias controller 6. The photo detector array 4 comprises pixel circuits 7 (FIG. 2) each including a separate photo detector element 8 e.g. an avalanche photodiode, and circuitry to record the output of its respective photo detector element 8.

Figure 2:
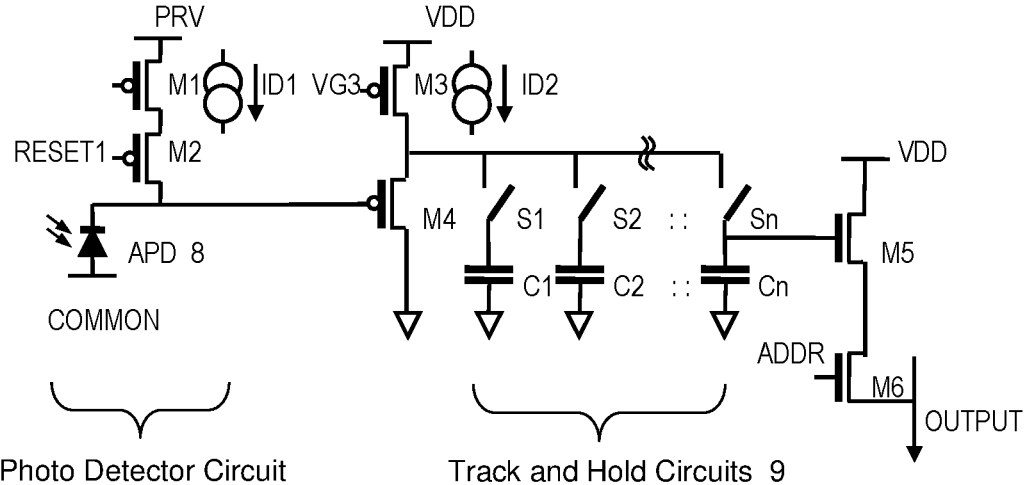
FIG. 2 is a schematic of a pixel circuit of a detector of the active imaging system.

FIG. 2 is a schematic of one of the pixel circuits 7. Each pixel circuit 7 comprises a photo detector circuit and 'n' number of track and hold circuits 9 where n>1. In one example n=5.

The photo detector circuit comprises, in addition to the photo detector element 8, an input reset transistor M2 and a reset current limit transistor M1 operable to bias the photo detector element 8.

The output of the photo detector element 8 is connected to each of the track and hold circuits 9 through a buffer amplifier implemented by a source follower transistor M4 and current source VDD. The source follower transistor M4 acts to isolate the photo detector circuit from changes in the capacitive load of the multiple track and hold circuits 9. The parasitic capacitances usually associated with a transistor circuit are not considered significant compared with the input and output load capacitances and so can be ignored.

Each track and hold circuit 9 comprises a storage capacitor C1-Cn, a switch S1-Sn (usually implemented by a transistor) through which the respective storage capacitor C1-Cn is connected to the drain terminal of the source follower transistor M4 and a readout circuit M5, M6 of which only one, that for track and hold circuit n, is shown.

The pixel circuit 7 further comprises transistor M3 connected between the current source VDD and the drain terminal of the source follower transistor M4. The transistor M3 is operated through a control signal VG3 from the bias controller 6 to control the bias point of the source follower transistor M4.

The photo detector elements 8, which are responsive to the wavelength emitted by the laser 1, are arranged in an array on a first semiconductor die. The source follower transistors M4 and track and hold circuits 9 are formed on a second semiconductor die. The first and second dies are bump bonded to electrically connect each photodetector element 8 into its respective pixel circuit 7.

Referring back to FIG. 1, in use the laser 1 illuminates a scene. Reflected laser light from the scene is imaged onto the array 4 of the photo detector elements 8 of the detector 3. Trigger signals from the base controller 2 to the laser 1 and detector 3 are used to coordinate their operation.

The trigger signal from the base controller 2 is used by the timing controller 5 to time the switching of the track and hold circuits 9 in sequence to capture the time-varying signal from the photodiode 8 over the gate period. The different values held on the track and hold circuits 9 provide information of target(s) in the scene at different distances from detector 3 and/or three-dimensional information of a target(s).

The circuitry of the timing controller 5 is provided on the same die as the track and hold circuits 9 to reduce jitter in the switching times of the switches S1-Sn of the track and hold circuits 9.

Figure 3:
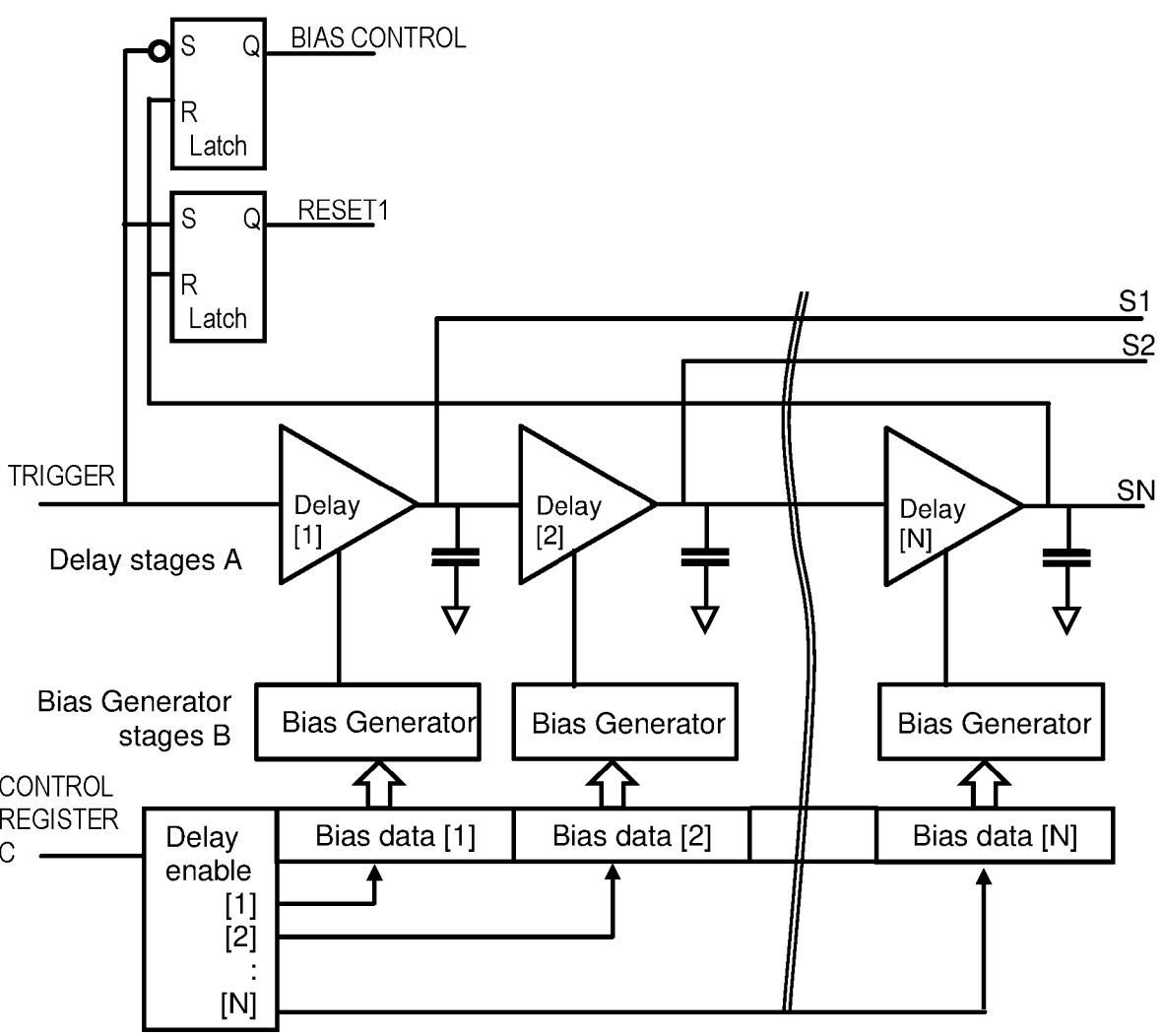
FIG. 3 is a schematic of a timing controller of the detector to control the timing of the operation of switches of track and hold circuits.

FIG. 3 is a schematic of an example implementation of circuitry of the timing controller 5 adapted to output control signals for controlling switches S1-Sn. The timing controller 5 comprises a chain of delay stages 5A[1] to 5A[N] each having an adjustable propagation delay. Each delay stage 5A[1] to 5A[N] is implemented by a pair of (though it could be more) inverters. The output of each delay stage 5A is connected to a different one of the switches (S1-Sn). I.e., the output of the first buffer 5A(1) is connected to switch S1 of the first track and hold circuit 9 of every pixel circuit 7 as well as to the input of the delay stage 5A(2), and the output of the delay stage 5A(2) is connected to switch S2 of the second track and hold circuit 9 of every pixel circuit 7 as well as the input of the third buffer 5A(3) and so on.

Figure 5:
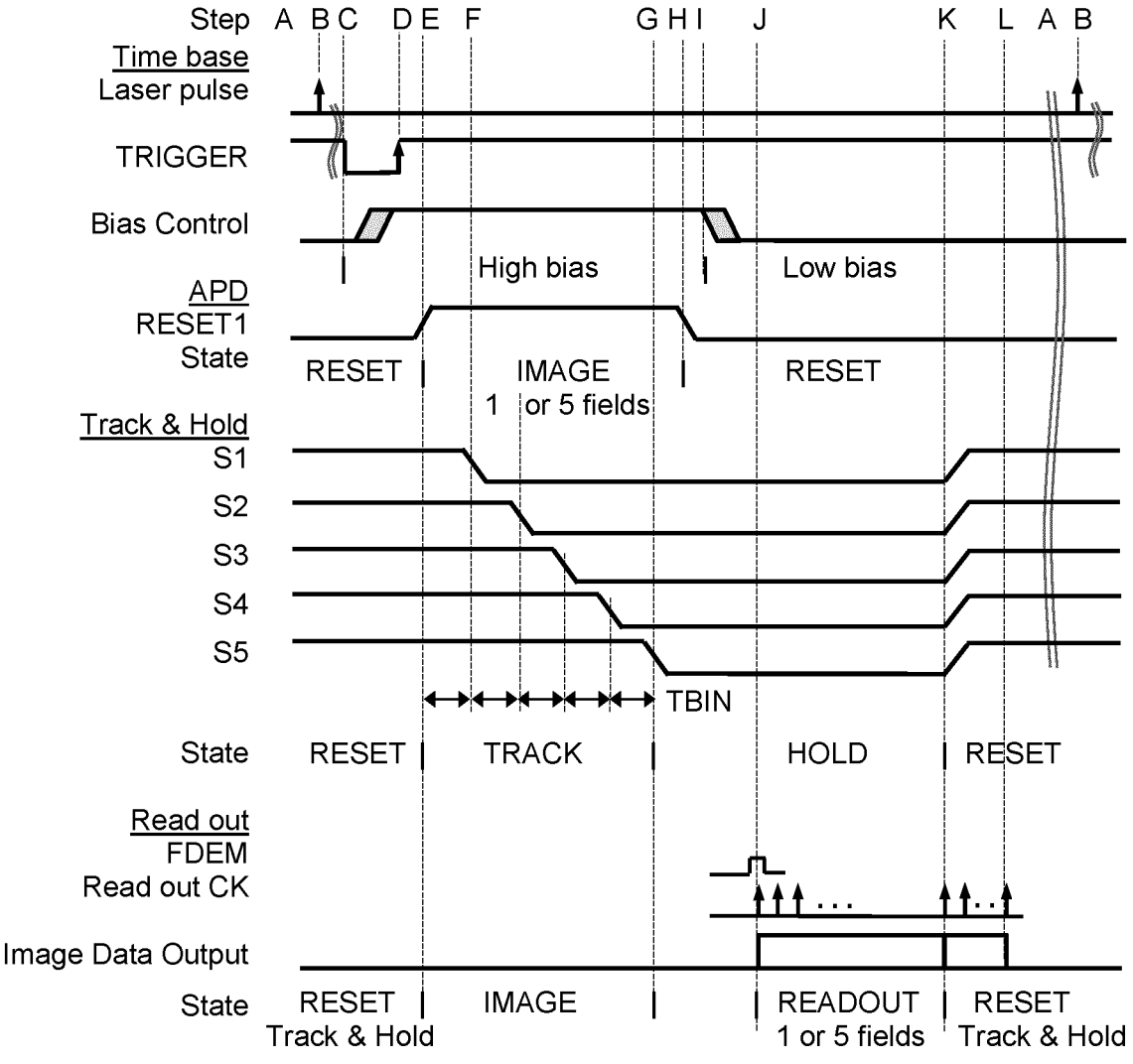
FIG. 5 is a timing chart illustrating an example timing regime for operation of the system.

With this arrangement, in response to the TRIGGER signal received at an input of the first delay stage 5A of the chain, the timing controller 5 outputs a sequence of control signals that operate each of the track and hold circuits 9 in sequence. In this embodiment, as illustrated in FIG. 5, the output signals from the chain operate the switches S1-Sn to disconnect the capacitors C1-Cn of the track and hold circuits 9 from the photo detector element 8 in sequence.

The outputs of the timing controller 5 are connected to all of pixel circuits 7 of the array 4 using a conventional balanced clock tree network to maintain timing uniformity between pixel circuits 7 across the photo detector array 4.

The timing controller 5 can be configured to control the time interval TBIN (see FIG. 5) between operating each of the track and hold circuits, i.e. the propagation delay of each delay stage independently, depending on application requirements. Depending on application an interval length within the range <200 ps to 30 ns will likely be suitable.

This is achieved through provision of multiple bias generators 5B, a separate one of the multiple bias generators being connected to one of the invertors in each delay stage 5A[1]-5A[N] through which the propagation delay of each delay stage 5A[1]-5A[N] of the chain can be set independently of the others by data (BIAS DATA) in a control register, thereby enabling the interval between operating each of the track and hold circuits 9 to be set individually.

The timing interval TBIN between operating each track and hold circuit is common to all pixel circuits 7 of the array 4, i.e. the interval between operating S1 and S2 will be the same for each pixel circuit 7 of the array 4.

The number of track and hold circuits 9 operating during a gate period may be configured from the control register to be less than the total number n by retracting (using a delay enable function) the bias generator signal to the relevant inverter(s) to give flexibility in the image acquisition mode.

The timing controller 5 also includes a bias control signal generator, in this example implemented by a latch (see top of FIG. 3) that is arranged to output a bias control signal BIAS CONTROL in response to receiving the TRIGGER.

Figure 4:
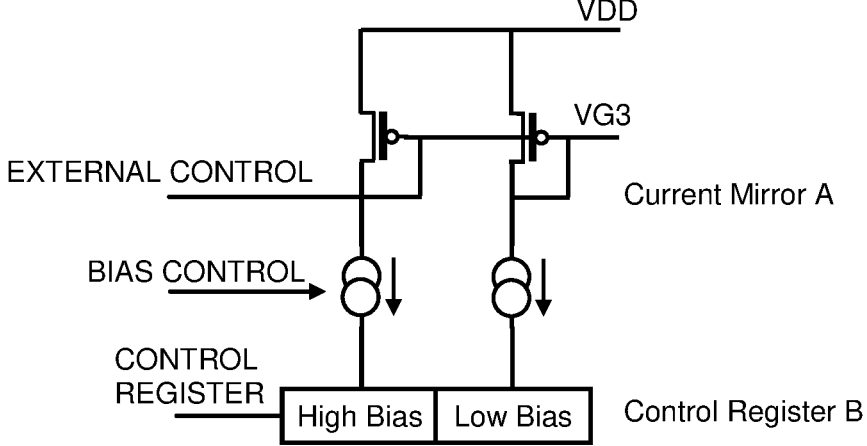
FIG. 4 is a schematic of a bias controller of the detector to control the bias point of the source follower transistors of the pixel circuit of FIG. 2.

FIG. 4 is a schematic of circuitry of the bias controller 6 used to control the bias point of the source follower transistors M4 of each pixel circuit 7 via transistor M3.

The bias controller 6 is adapted to switch the bias point of the source follower transistors M4 of the pixel circuits 7 between a low current value and a high current value in response to the BIAS CONTROL signal (and thus indirectly from the TRIGGER from the time base controller 2). The switching is timed so that most of the time the source follower transistor M4 is biased in the low bias state (quiescent state) but is operated to be biased in the high current state during the whole gate period, i.e. during the period of the frame that photo signal is being collected by the photo detector elements 8 and captured on the track and hold circuits 9. Because the gate period is significantly shorter than the frame period this leads to a large reduction in power usage.

The bias controller 6 comprises a programmable current mirror circuit configured by a control register.

The programmable current mirror circuit comprises two mirror stages each controlled by a different control register data bit.

The quiescent and pulse high current values are set by switching mirror stages into or out of the current mirror circuit. Switching an additional stage into the current mirror circuit increases VG3, and hence increases all connected pixel source follower transistor M4 bias current values across the array.

Alternatively, the bias controller 6 may be adapted to receive an externally generated control signal (this arrangement is also illustrated in FIG. 3) to directly configure the current mirror drain voltage to control the VG3 signal. This approach is, however, less preferred than using the trigger signal because an additional wave form is required and, being generated externally to the die, becomes susceptible to external timing accuracy and jitter.

In one example, the mirror circuit may be arranged so that the quiescent bias current has a value of a few, i.e less than 10, microamps and the high bias current has a value in the range 10 microamps-100 microamps.

Below is described an example configuration sequence for the active imaging system on start up.

i. The system is initialised.

ii. The system is configured and held in reset prior to operation.

iii. The photo detector bias voltage is configured to operate the array of photodetectors 8 at the required gain.

iv. The timing controller 5 is configured with the required track and hold interval value TBIN (or multiple TBIN values where different timing intervals are to be used between operating different track and hold circuits).

v. The bias controller 6 is configured with the quiescent (low) current and pulsed (high) operating current values.

vi. The photo diode array 4 is held in reset by the pixel circuit array. In reset: the photodiode array output is not responsive to photo signals; the track and hold capacitor voltages increase to a reset voltage level. Alternatively, the track and hold capacitors may be reset to an alternative value using the reset transistor. Where this voltage differs significantly from the transistor source voltage value, excess current can be expected to flow.

vii. The pixel array is ready to be triggered.

viii. The system is operated.

FIG. 5 shows an example timing chart and operating sequence for an active imaging system where each pixel circuit 7 comprises five storage circuits.

The photodiode array 4 is held in reset. All Track and Hold (T&H) circuits 9 are in a reset state from previous frame (A).

In response to a trigger signal from the time base controller 2 to the laser 1, the laser 1 is fired (B).

The TRIGGER input from the time base controller 2 to the detector 3 is retracted (falling edge) (C). In response the bias controller 6 changes the bias state of the source follower transistors M4 from the quiescent current value to the higher current value. This occurs before the T&H circuits 9 are initiated giving time for the bias current to stabilise.

The TRIGGER input from the time base controller 2 is asserted (rising edge) (D). In response the timing controller

5 initiates the T&H circuit control timing sequence and retracts the photodiode 8 array reset signal RESET (E). The photo array 4 is responsive to photo signals. Increasing photo signals reduce the gate and source voltage of the source follower transistor M4. The T&H capacitor C1-Cn voltages reduce proportionally as the capacitors C1-Cn are discharged by the source follower transistor M4.

The timing controller 5 retracts each of the T&H control signals in sequence at times defined by the configured timing interval at (iv) (F-G). As each gate closes, the accumulated photo signal at that point in time is captured. The difference in signal stored on a T&H circuit and the T&H circuit before it in the sequence represents the signal acquired within that track and hold bin time TBIN within the gate period. E.g. the signal acquired in the third gate period corresponds with the voltage value held on C3 minus the value held on C2. Photo signal acquisition is complete (G). Each pixel circuit 7 holds multiple samples of the photo signal information at different time points or range depths. Each sample represents the photo signal from a more distant part of the target or range depth.

In the example of FIG. 5, the interval TBIN between switching each (except the first) track and hold circuit 9 in turn is the same but in other embodiments may be different.

After the 1 to n samples have been acquired: the timing controller 5 asserts the photodetector 8 array RESET signal (H) causing the photodetectors 8 of the array to revert to reset condition.

The bias controller 6 is then operated from the completion of the last T&H control signal Sn to switch the bias condition of the source follower transistor M4 from the higher value to the quiescent value (I).

The system operates to read out the signal information. Frame demand (FDEM) and clock (CK) signals are operated conventionally to address and read out track and hold circuits 9 in sequence (J). This is conventional and so not described in further detail.

The track and hold gate control signals S1-Sn are retracted to reset voltages on capacitors C1-Cn, ready for the next signal acquisition event (L).

In a variant embodiment the timing controller 5 may be implemented by means other than a chain of inverters, for example, linear amplifiers with delay stages, or comparator stages triggering at variable points on a ramp.

The invention claimed is:

1. An image sensing device for use in an active imaging system, the image sensing device including:

multiple pixel circuits, each pixel circuit including:

a) a photo detector circuit including a photo detector element configured and arranged to output a time varying photo signal during a gate period;

b) multiple storage circuits each arranged to receive and store the photo signal from the photo detector circuit; and c) plural switches, a separate switch being associated with each storage circuit through which each respective storage circuit is connectable to the photo detector circuit;

the image sensing device including:

a timing controller circuitry configured to operate the switches in sequence to capture samples of the time varying photo signal at different times over the gate period;

wherein each storage circuit of the multiple storage circuits includes:

a track and hold circuit; and each respective pixel circuit includes:

a buffer amplifier connected between the photo detector circuit of the respective pixel circuit; and the multiple track and hold circuits of a respective pixel circuit, each buffer amplifier being configured to isolate the photo detector circuit from changes in a capacitive load of multiple ones of the storage circuits; and wherein the timing controller circuitry is configured to operate plural ones of the separate switches so that a time varying photo signal will be stored by multiple track and hold circuits for a period within a gate period of a different duration from other track and hold circuits, the gate periods of different duration being concurrent.

2. An image sensing device according to claim 1, in combination within an active imaging system, wherein each buffer amplifier comprises:

a source follower transistor and a current source load; and wherein the active imaging system includes:

a bias controller to configure the source follower transistor between a low current value bias condition and a high current value bias condition, with switching being configured to be timed such that a source follower transistor will operate in the high bias condition during a gate period.

3. An image sensing device according to claim 1, wherein the timing controller circuitry and the multiple track and hold circuits are configured on a single integrated circuit (IC) die.

4. An image sensing device according to claim 1, wherein the timing controller circuitry comprises:

a chain of inverters.

5. An image sensing device according to claim 1, wherein the timing controller circuitry is configured to vary an interval between operating the switches.

6. An image sensing device according to claim 1, wherein the photo detector circuit comprises:

an avalanche photo detector.

7. A method of operating an image sensing device having a focal plane array, the image sensing device including multiple pixel circuits, each pixel circuit including:

a photo detector circuit including a photo detector element configured and arranged to output a time varying photo signal during a gate period; and multiple storage circuits, each including a track and hold circuit, each configured and arranged to receive and store the time varying photo signal from the photo detector circuit, each track and hold circuit including a switch through which a respective track and hold circuit is connectable to the photo detector circuit, the method comprising:

isolating each pixel circuit, each pixel circuit including:

a buffer amplifier connected between the photo detector circuit and the multiple track and hold circuits, the buffer amplifier isolating the photo detector circuit from changes in a capacitive load of multiple ones of the storage circuits; and operating timing circuitry of the switches to capture samples of the time varying photo signal at different times over the gate period.

8. A method according to claim 7, comprising:

controlling timing of the switches of each track and hold circuit individually.

9. A method according to claim 7, comprising:

using a common trigger signal which is arranged to be received by a bias controller at an active imaging system, timing circuitry and the photo detector circuit to:

alter a bias condition of a source follower transistor from a quiescent bias condition to the high bias condition;

operate the switches of the track and hold circuits; and set the photo detector circuit responsive to a laser return photo signal.

10. A method according to claim 7, comprising:

configuring each pixel circuit to operate between a first operating mode in which each of the track and hold circuits operate during the gate period, and a second operating mode in which all but one of the track and hold circuits are inoperable throughout an entirety of the whole gate period.

11. A system, comprising:

an image sensing device in combination with an active imaging system, the image sensing device including:

multiple pixel circuits, each pixel circuit including:

a) a photo detector circuit including a photo detector element configured and arranged to output a time varying photo signal during a gate period;

b) multiple storage circuits each arranged to receive and store the photo signal from the photo detector circuit; and c) plural switches, a separate switch being associated with each storage circuit through which each respective storage circuit is connectable to the photo detector circuit;

a timing controller circuitry configured to operate the switches in sequence to capture samples of the time varying photo signal at different times over the gate period;

wherein each storage circuit of the multiple storage circuits includes:

a track and hold circuit; and wherein each respective pixel circuit includes:

a buffer amplifier connected between the photo detector circuit of the respective pixel circuit, wherein each buffer amplifier comprises:

a source follower transistor and a current source load; and the multiple track and hold circuits of a respective pixel circuit, each buffer amplifier being configured to isolate the photo detector circuit from changes in a capacitive load of multiple ones of the storage circuits; and the active imaging system includes:

a bias controller to configure the source follower transistor between a low current value bias condition and a high current value bias condition, with switching being configured to be timed such that a source follower transistor will operate in the high bias condition during a gate period.

\* \* \* \* \*